Nov. 25, 1941.   E. W. CLEVELAND ET AL   2,263,717
LANDING WHEEL MOUNTING FOR AIRCRAFT
Filed March 31, 1938
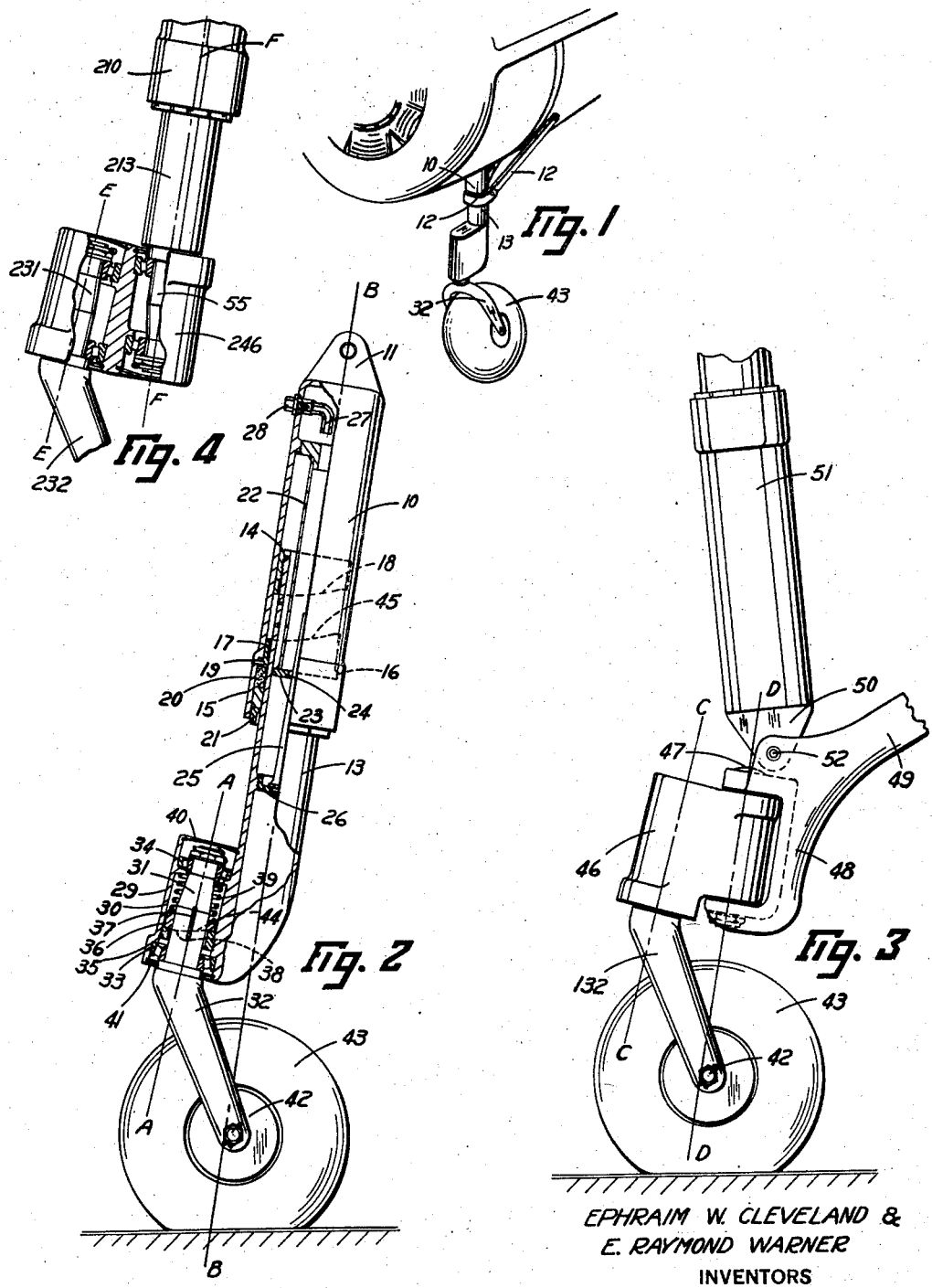
EPHRAIM W. CLEVELAND &
E. RAYMOND WARNER
INVENTORS
BY John C. Renfer
ATTORNEY Patented Nov. 25, 1941

2,263,717

UNITED STATES PATENT OFFICE 2,263,717

LANDING WHEEL MOUNTING FOR AIRCRAFT

Ephraim W. Cleveland, Berea, and E. Raymond Warner, Cleveland, Ohio, assignors to The Cleveland Pneumatic Tool Company, Cleveland, Ohio, a corporation of Ohio Application March 31, 1938, Serial No. 199,284

31 Claims. (Cl. 244—104)

This invention relates broadly to aircraft, but more particularly to a new and improved nose or tail wheel assembly suitable for use with aircraft.

Heretofore, nose or tail wheel assemblies for aircraft were of the common caster type, wherein the wheel knuckle was mounted for swiveling movement on a single axis. With this type of construction, it has been found that during landing and taxiing, the wheel would shimmy, that is oscillate laterally and transmit to the aircraft undue vibrations or jars detrimental to the comfort of its passengers as well as resulting in the premature wear and often breakage of the landing gear.

It is therefore one object of this invention to produce a nose or tail wheel assembly of the caster type constructed and arranged in a manner causing the wheel, when in contact with the ground, to remain central, that is in line with the direction of motion of the aircraft.

Another object of this invention is to produce an improved nose or tail wheel assembly equipped with a self centering device to normally maintain the wheel central but allow it to swing laterally when subjected to abnormal forces.

Another object of this invention is to produce such improved wheel mounting forming a compact assembly which is strong, durable and efficient.

Other objects and advantages more or less ancillary to the foregoing reside in the specific construction and aggroupment of the elements peculiar to this structure, as will become apparent from a more complete examination of this specification.

In the drawing which illustrates the invention in connection with a nose wheel assembly:

Fig. 1 is a perspective view of the front lower portion of an aircraft having the invention applied thereto.

Fig. 2 is a side elevational view of one form of the invention, the view being partly in section to show details of construction.

Fig. 3 is a side elevational view of another form of the invention.

Fig. 4 is a side elevational view of another modified form of the invention.

Referring to the drawing, and more particularly to Fig. 2 wherein the invention is shown in connection with a shock absorbing strut, 10 represents the outer cylindrical housing of an oleo shock absorber having a closed upper end formed with a clevis 11 for attachment of the assembly to the aircraft. As shown in Fig. 1, additional braces 12 may be provided between the housing 10 and the airplane for rigidly securing the wheel assembly in operative position.

Slidable within the housing 10, there is an inner cylinder 13 formed at its upper end with a piston 14 rigidly secured thereto for slidable engagement with the inner wall of the housing 10, which housing has its lower end portion enlarged as at 15 to accommodate the annular flange 16 of a bushing 17 extending part way into the housing 10, and with which the lower end wall of the piston 14, which is shaped to form a cam 18, is engageable for limiting the downward stroke of the inner cylinder 13. The bushing 17 is keyed to the housing 10 against rotation relative thereto by a cross pin 19. Below the bushing 17, there are located within the enlargement 15 suitable packings 20 held in operative position by a gland nut 21, thus forming a fluid tight joint between the two cylinders 10 and 13.

Depending from the upper inner end portion of the housing 10, there is a metering pin housing 22 terminated at its lower end by a plate 23 in slidable engagement with the inner wall of the inner cylinder 13, and having therethrough a central orifice 24 through which is slidably mounted a metering pin 25 carried by a partition 26 screwed or otherwise secured within the inner cylinder 13 at a place intermediate the ends thereof.

Adequately secured to the upper end portion of the housing 10, there is a filler tube 27 extending into the housing, which tube is closed by a removable plug 28 through which hydraulic fluid and compressed air may be admitted into the shock absorber.

From the foregoing description, it will be understood that the shock absorber shown in Fig. 1, may be of any suitable type, and since its construction and operation does not form a part of this invention other than being used as a medium to carry the landing wheel, no further explanation is thought necessary, other than pointing out that for reasons which will be explained later, it is necessary that the inner cylinder 13 be capable of rotation relative to the outer housing 10.

Referring now more particularly to the invention, the lower end portion of the inner cylinder 13 is formed with an integral boss 29 extending on one side thereof and having a bore 30 extending longitudinally therethrough. Rotatable within the bore 30, there is the spindle 31 of a wheel knuckle 32, which spindle is journaled within anti-friction bearings 33 and 34 adequately held in position within the bore 30. Located within the bore 30, there is a self centering device intended to normally maintain and urge the knuckle 32 in the position shown in Fig. 1, which device includes two rings 35 and 36 surrounding the spindle 31, the ring 35 being held stationary within the bore 30, while the ring 36 is locked to the spindle 31 against rotation by a key 37, but is capable of axial movement relative to the ring 35. The abutting faces of the rings 35 and 36 are shaped to form a cam 38 and 44 respectively, which cams are constantly urged toward each other by a compression spring 39 acting on the ring 36. The bore is preferably closed at its upper end by a removable spring cover 40, and at its lower end by a similar cover 41 closely fitting around the spindle 31, thereby preventing admission of dust or other foreign matter into the bore 30, which in practice is filled with suitable lubricant such as grease or the like. The wheel knuckle 32 is shown in Fig. 1 to be shaped as a fork through the end portions of which extends a cross shaft 42 having rotatable thereon a landing wheel 43.

In order to assure the proper position of the wheel 43 when landing, the shock absorber is preferably provided with a self locking of centering device similar to that above described, which device may include the cam surface 18 of the piston 14, and a similar cam 45 formed on the end wall of the bushing 17.

In the modification shown in Fig. 3, the wheel knuckle 132 is a replica of the knuckle 32, except that instead of being rotatable within a boss formed on the shock absorber, it is rotatable within a housing 46, which housing is rotatable on a shaft 47 carried by one end 48 of a brace 49, which brace has its other end (not shown) pivotally secured to the airplane. The end portion 48 of the brace 49 is also adequately shaped to receive one end 50 of a shock absorber 51, which end is pivotally secured to the brace by a cross pin or shaft 52, while the other end (not shown) of the shock absorber is also pivotally secured to the airplane.

In the modification shown in Fig. 4, 210 represents the outer cylinder of a shock absorber similar to that shown in Fig. 2, within which cylinder is slidably mounted an inner cylinder 213. In this modified construction, the inner cylinder 213, which may be locked against rotation relative to the outer cylinder 210, has its lower end shaped like a spindle 55 on which is rotatably mounted a housing 246 which is similar to the housing 46 in Fig. 3. The wheel knuckle 232, which is a replica of the wheel knuckle 32, has its spindle 231 rotatably mounted within the housing 246, thus affording a double swivel connection between the wheel knuckle 232 and its support 213.

From the foregoing description, it will be understood that the wheel knuckle 32 is capable of rotation on the center axis of its spindle 31, which axis is shown by line A—A, and around the central axis B—B of the shock absorber.

Heretofore, nose and tail wheel assemblies were of the common caster type, wherein the wheel-knuckle-spindle was capable of rotation only on its own axis, and the wheel-knuckle arranged and constructed in a manner causing the centroid of the contact area of the wheel to the ground plane to be located to the rear of the center axis of the spindle, thereby causing the wheel to trail in reference to the motion of the supported aircraft. The force which tends to center the wheel or make it trail properly, is the drag force resulting from the fraction of the contact area of the wheel with the ground, and if friction in the rest of the assembly is neglected, that force is the only one acting horizontally as long as the center axis of the wheel-knuckle-spindle is perpendicular to the ground-plane. However, due to the movement of the aircraft relative to the ground when landing or taxiing, the center axis of the spindle will be forced to depart from its perpendicular relation with the ground-plane, causing component horizontal forces to act on the wheel, the intensity and direction of which will vary in accordance with a variation in the angular relation of the spindle center axis with the ground-plane, thus causing the component forces to act either with or against the drag force above mentioned.

In practice, it has been found that with the combination of forces above referred to, it was impossible to produce a single spindle wheel assembly wherein the wheel would remain central throughout the entire range of conditions encountered in aircraft. For instance, when the spindle was located in a manner causing the component forces to act with the drag force, it was found that the resulting force acting on the wheel was too severe to center the wheel. In this instance, the wheel was actually over stable, causing it to swing wildly from one to the other side of its normal trailing position. Best results were obtained with the spindle sloping upwardly in a fore and aft direction, but that construction was efficient only for a predetermined condition of operation, and was not practical because a variation in the load of the craft would again cause the wheel to oscillate laterally. In this instance, the drag force acting on the wheel does not vary in proportion to the opposing component forces, thus subjecting the wheel to a new combination of opposed forces causing lateral oscillatory movement of the wheel.

In the single spindled castered wheel mounting above referred to, the spindle was held against lateral movement but free to rotate on its own axis. The lateral forces acting on the wheel were transmitted to its knuckle and resisted by the spindle housing, thus causing a lateral oscillatory movement of the wheel. In the present construction, the lateral forces acting on the wheel 43 are transmitted to the spindle 31, causing it to swing slightly around the center axis B—B, thereby dampening the effect of the forces acting on the wheel 43 and eliminating its lateral oscillations. It is apparent that in Fig. 2, the connection between the spindle 31 and its supporting member or housing 10, is actually a floating or flexible connection enabling lateral movement of the spindle and consequently preventing the shimmy or lateral oscillatory movement of the wheel 43.

In this improved construction, the spindle 31 is sloping upwardly in a fore to aft direction relative to the craft when resting on the ground, or disposed in a manner calculated to afford the best stable condition for a wheel assembly of the single spindle type, while the axis B—B, that is the swiveling axis of the spindle housing 29 is also sloping upwardly in a fore to aft direction relative to the craft when resting on the ground, causing the weight of the aircraft to maintain this spindle housing in the position shown in Figs. 1 and 2. With this improved construction, best results are obtained when the amount of offset of the spindle 29 relative to the center axis B—B is kept relatively small, with the center axis B—B passing relatively close to the center axis of the wheel 43, and the two axes A—A and B—B are converging upwardly at an angle of 3 to 4 degrees.

In the modification shown in Fig. 3, the spindle of the wheel knuckle 132 is rotatable within its housing 46 on an axis C—C corresponding to the axis A—A in Fig. 2, while the housing 46 is capable of swiveling motion around the axis D—D corresponding to the axis B—B in Fig. 2. It is apparent that in this modified construction, the connection between the wheel knuckle 132 and its supporting member or brace 49, is also a floating or flexible connection enabling lateral movement of the wheel-knuckle-spindle, thereby preventing the shimmy of the wheel 43 for the reasons above mentioned.

In the modification shown in Fig. 4, the spindle 231 of the wheel knuckle 232 is rotatable within its housing 246 on an axis E—E, while the housing 246 is capable of rotation around the center axis F—F of the stationary spindle 55. In this modified construction, it will be understood that due to the swivel connection between the housing 246 and the inner cylinder 213, this cylinder can either be free to rotate relative to the outer cylinder 210 or be locked against rotation relative thereto.

Referring now to the self centering devices included in the construction shown in Fig. 2, it will be understood that when the aircraft is off the ground, the compressed air stored within the shock absorber together with the weight of the inner cylinder 13 and its component parts, will cause this cylinder to assume a fully extended position. In this instance the cam shaped surface 18 of the piston 14 will engage the corresponding cam shaped surface 45 of the bushing 17, exerting pressure thereon and effecting a camming action therebetween causing the inner cylinder 13 to assume the position shown in Fig. 2 and remain in that position preparatory to the landing of the aircraft.

In the self centering device included within the spindle housing 29, the ring 36 which is keyed on the spindle 31 but axially movable relative thereto, is constantly pressed on the ring 35 by the compression spring 39, causing the cam surface 44 of the ring 36 to act on the corresponding cam surface 38 of the ring 35 for urging and normally maintaining the wheel 43 in the position shown in Fig. 2. The strength of the compression spring 39 is calculated to enable rotation of the spindle 31 when the wheel 43 is subjected to abnormal lateral forces, such as resulting from the steering of the aircraft when taxiing.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

We claim:

1. A landing wheel mounting for aircraft, including a support, a wheel carrying knuckle, and a double swivel connection between said support and knuckle, the rear side of the center axis of each swivel relative to the craft forming with the ground when the craft rests on the ground an acute angle.

2. A landing wheel mounting for aircraft including a support connected to the craft, a housing, a swivel connection between said support and housing, a wheel carrying member, and a swivel connection between said housing and member, the angle measured between the rear side of the center axis of each swivel relative to the craft and the ground when the craft rests on the ground being less than 90°.

3. A landing wheel mounting for aircraft including a support connected to the craft, a housing carried by said support for rotation relative thereto, a wheel carrying member, and a swivel connection between said housing and member located ahead of the axis of rotation of said housing relative to the craft's normal direction of motion, the rear side of said axis and of the swivel axis relative to the craft forming with the ground when the craft rests on the ground acute angles.

4. A landing gear for aircraft comprising a ground engaging member, and connecting means between the craft and said member including a duality of spindles, the angle measured between the rear side of the center axis of each spindle relative to the craft and the ground when the craft rests on the ground being less than 90°.

5. In a landing gear mounting for aircraft, a support, a ground engaging member, and connecting means between said support and member including a duality of spindles sloping in a manner causing the rear side of each spindle axis relative to the craft to form with the ground when the craft rests on the ground an acute angle.

6. In a landing gear mounting for aircraft, a cylindrical housing connected to the craft, a cylindrical member rotatable within said housing, a wheel carrying knuckle, and connecting means between said member and knuckle including a spindle rotatably carried by said member in offset relation with the center axis thereof, the rear side of the center axis of the housing and spindle relative to the craft each forming with the ground when the craft rests on the ground an acute angle.

7. In a landing gear for aircraft, a wheel carrying knuckle, and supporting means for said knuckle including a plurality of swivel connections arranged and disposed in a manner enabling rotation of said knuckle on two axes each having its rear side relative to the craft forming with the surface on which the craft rests when supported by its wheel an acute angle.

8. In a landing gear for aircraft, an oleo shock absorber including an upper cylinder secured to the craft, a wheel carrying member, and a swivel connection between said shock absorber and member, said shock absorber and connection being constructed and arranged in a manner enabling rotation of said member on two axes each having its rear side relative to the craft forming with the ground when the craft rests on the ground an acute angle.

9. In a landing gear for aircraft, a swiveling wheel, and an axially rotatable post connecting said wheel to the craft, said post being located behind the swiveling axis of said wheel relative to the normal direction of motion of the craft, the rear side of the axis of rotation of said post and of said swiveling axis relative to the craft each forming with the ground when the craft rests on the ground an acute angle.

10. In a landing gear for aircraft, a cylindrical housing depending from the craft, an axially rotatable post carried by said housing, a wheel carrying member, and connecting means between said post and member including a spindle rotatably carried by said post on an axis offset relative to the center axis of said post, the rear side of the offset axis and of said center axis relative to the craft forming with the ground when the craft rests on the ground an acute angle.

11. In a landing gear for aircraft, an elongated support including a duality of elements one secured to the craft and the other axially rotatable relative to the former, a wheel carrying member, and a swivel connection between said rotatable element and member enabling rotation of said member on an axis offset relative to the center axis of said support, the rear side of the rotary axis of said member relative to the craft forming with the ground when the craft rests on the ground an acute angle.

12. In a landing gear for aircraft, a ground engaging element, a member operatively carried by said element, a support between said member and the craft, a pivotal connection between said member and support, and a pivotal connection intermediate the ends of said support, said connections arranged and disposed in a manner enabling said element to revolve partly around two axes, one center axis of said first connection being offset relative to the other and having the rear side thereof relative to the craft forming with the ground when the craft rests on the ground an acute angle.

13. In a landing gear for aircraft, an oleo shock absorber secured by its upper end to the craft, a wheel carrying member mounted on the lower end of the shock absorber and carried exclusively thereby, and flexible connections between said member and the upper end of the shock absorber enabling said member to rotate on an axis and to revolve partly around another, the rear side of each of said axis relative to the craft forming with the ground when the craft rests on the ground an acute angle.

14. In a landing gear for aircraft, a ground engaging wheel rotatable within a vertical plane, a carrying member for said wheel, a rotatable support for said member, and a swivel connection between said member and support, the axis of rotation of said support and the swiveling axis of said connection being located within said vertical plane with said axis of rotation passing closer to the center axis of said wheel than said swiveling axis, the angle measured between the rear side of each axis relative to the craft and ground when the craft rests on the ground being less than 90°.

15. In a landing gear for aircraft, a ground engaging wheel, a carrying member for said wheel, a rotatable support for said member, and a swivel connection between said member and support, the axis of rotation of said support passing closer to the center axis of said wheel than the swiveling axis of said connection, the rear side of each axis relative to the craft forming with the ground when the craft rests on the ground an acute angle.

16. In a landing gear mounting for aircraft, a support, a ground engaging member, connecting means between said support and member including a duality of spindles, the rear side of the center axis of each spindle relative to the craft forming with the ground when the craft rests on the ground an acute angle, and self centering means for said member normally maintaining it in a predetermined position and capable of driving said member into said pivotal position after its departure therefrom by forces to which said member may be subjected.

17. A caster for aircraft including a plurality of spindles, the angle measured between the rear side of the center axis of each spindle relative to the craft and the ground when the craft rests on the ground being less than 90°.

18. A caster for aircraft including a plurality of spindles, the angle measured between the rear side of the center axis of each spindle relative to the craft and the ground when the craft rests on the ground being less than 90°, and bearing means for one of said spindles axially slidable relative thereto.

19. A caster for aircraft including a duality of spindles, the rear side of the center axis of each spindle relative to the craft forming with the ground when the craft rests on the ground an acute angle, and a bearing for each spindle one higher than the other.

20. A caster for aircraft including a duality of spindle members, the rear side of the center axis of each spindle member relative to the craft forming with the ground when the craft rests on the ground an acute angle, and a bearing for each spindle member one lower than the other and carried by one of said spindle members.

21. In a landing gear for aircraft, a shock absorber including a pair of telescoping cylinders one secured to the craft and the other rotatable on its own axis, a ground engaging member, a swivel connection between said rotatable cylinder and member, the angle measured between the rear side of the axis of rotation of said rotatable cylinder and of said connection relative to the craft and the ground when the craft rests on the ground being less than 90°.

22. In a landing gear for aircraft, a support, a ground engaging member, connecting means between said support and member including a duality of spindles, the angle measured between the rear side of the center axis of each spindle relative to the craft and the ground when the craft rests on the ground being less than 90°, and self centering means for at least one of said spindles capable of rotating it to a specific position about its center axis after its departure therefrom by forces to which said spindle may be subjected.

23. An anti-shimmy mounting for a vehicle wheel, comprising a support mounted on the axle of said vehicle, said support including pivotal means with its pivotal axis offset from the center of the wheel, means engaging said first pivotal means and including a second pivotal means, and mounting means secured to said second pivotal means for attaching said assembly to a vehicle with the rear side of each axis of both pivotal means relative to the vehicle forming with the surface upon which the vehicle rests when supported by its wheel an acute angle.

24. An anti-shimmy mounting for a caster for a vehicle, comprising means engaging the pivotal means of said caster and including a second pivotal means, means engaging said second pivotal means for mounting said assembly on the vehicle with the rear side of each axis of both pivotal means relative to the vehicle forming with the surface upon which the vehicle rests when supported by its wheel an acute angle.

25. In a vehicle having a frame, a support mounted on the frame, an anti-shimmy member pivotally mounted on the support and including a second support having an axis of rotation offset from but extending in the same general direction as that of said first pivotal support, and a caster mounting mounted on said second pivotal support and rotatable about the axis thereof and including a ground engaging element offset with respect to the axis of said second pivotal support, the spacing of the axes of the two pivotal supports being such that said member, mounting, and element can freely rotate 360° without contacting any other member of said vehicle.

26. In a vehicle having a frame, a support mounted on the frame, an anti-shimmy member pivotally mounted on the support and including a second support having an axis of rotation offset from but extending in the same general direction as that of said first pivotal support, and a caster mounting mounted on said second pivotal support and including a ground engaging element offset with respect to the axis of said second pivotal support, said member and caster mounting together with its ground engaging element being freely rotatable 360° about the axes of each of said pivotal supports.

27. An anti-shimmy mounting for a ground engaging member of a vehicle, comprising a support secured to said member, said support including pivotal means with its pivotal axis offset from the center of the ground engaging portion of the ground engaging member, the vehicle including pivotal means having an axis inclined from the vertical, means pivotally securing the pivotal means of said support to the pivotal means of said vehicle with the pivotal axes of said means in spaced relation and extending in the same general direction and with the axis of one means revolvable repetitiously, free from restriction, about the axis of the other pivotal means in the position in which it is carried by the vehicle, in either direction.

28. In a landing gear for aircraft, a shock absorber including a pair of telescoping cylinders one secured to the craft and the other rotatable on its own axis, a knuckle having a ground engaging wheel operatively carried thereby, and a swivel connection between said rotatable cylinder and knuckle, the center axis of said rotatable cylinder and the axis of said swivel connection both extending upwardly from the ground with the starting point of the former located between the starting point of the latter and the centroid of the wheel contact area with the ground.

29. In a landing gear for aircraft, a shock absorber including a pair of telescoping cylinders one secured to the craft and the other rotatable on its own axis, a wheel supporting member having a ground engaging wheel rotatable thereon, and a swivel connection between said rotatable cylinder and member, the axis of rotation of said rotatable cylinder and the center axis of said swivel connection both leading upwardly from the ground with the starting point of said axis of rotation located between the starting point of said center axis and the axis of rotation of said wheel.

30. A castor for aircraft including a duality of spindles one longer than the other, a bearing member for the longer spindle axially slidable relative thereto, and bearing means for the shorter spindle operatively mounted within the longer spindle near the outer end thereof.

31. A landing gear for aircraft comprising a ground engaging wheel, and connecting means between said wheel and the craft including a duality of spindles one longer than the other, the axes of rotation of said spindles leading upwardly from the ground with the starting point of the axis of the longer spindle located between the starting point of the other axis and the centroid of the wheel contact area with the ground.

EPHRAIM W. CLEVELAND.
E. RAYMOND WARNER.